United States Patent [19]
Watson et al.

[11] 4,108,537
[45] Aug. 22, 1978

[54] LIGHT VALVE SYSTEM FOR MOTION PICTURE FILM PRINTER

[75] Inventors: Charles J. Watson, Elgin; Walter Hrastnik, Chicago, both of Ill.

[73] Assignee: Bell & Howell Company, Chicago, Ill.

[21] Appl. No.: 756,047

[22] Filed: Dec. 30, 1976

[51] Int. Cl.² .......................... G02F 1/03; G03B 27/28
[52] U.S. Cl. ..................... 350/150; 350/174; 355/88
[58] Field of Search ............ 350/150, 173, 174; 355/83, 88, 35, 36, 38; 346/108

[56] References Cited
U.S. PATENT DOCUMENTS

| | | | |
|---|---|---|---|
| 3,708,797 | 1/1973 | Solomon et al. | 350/174 |
| 3,752,577 | 8/1973 | Grossetete et al. | 355/83 |

*Primary Examiner*—John K. Corbin
*Assistant Examiner*—Wm. H. Punter
*Attorney, Agent, or Firm*—Robert J. Schneider; Roger M. Fitz-Gerald

[57] ABSTRACT

An electro-optic light valve is disclosed which is particularly adapted to be used in an additive color printing system for use on conventional photographic film printers. The additive color system utilizes a plurality of light valves, one for each of the monochromatic light beams, for controlling the color balance and light beam intensity of the printing light beam on the photographic film printer. A programmable, electronic control system is provided for driving the light valves in accordance with programmed color balance and intensity information. Closed loop feedback is provided from the electro-optic light valves to the control system to guarantee accurate execution of the programmed information.

22 Claims, 7 Drawing Figures

LIGHT VALVE SYSTEM FOR MOTION PICTURE FILM PRINTER

BACKGROUND OF THE INVENTION

1. Field of the Invention

The present invention relates to electro-optic light valves and an electronic control system therefore. Particularly the invention relates to an electronic light valve apparatus suited for use on a photographic film printer and a control system for regulating the light valves in accordance with programmed information.

2. Description of the Prior Art

The use of light valves in photographic film printing to adjust for color balance and hue corrections is well known in the art. Color balance correction is often required during a printing process to accommodate for the various lighting conditions used for photographing original scenes during the production of a movie. Since some scenes are often shot outdoors under natural lighting conditions, and other scenes are shot indoors under various artificial lighting conditions, the color rendition of actor's clothing and the like will appear to be different in various scenes. Therefore, customarily, during the printing operation, when the preprint film is printed onto raw stock, the color content of the printing beam is varied in order to achieve a motion picture movie print in which the color changes are not noticeable to the viewer.

An additive color system is provided on the photographic film printer to vary the color content of the printing beam. In one type of apparatus, a substantially white light beam is separated into three substantially monochromatic light beams, i.e., the primary colors red, blue and green, by a plurality of dichroic mirrors. A light valve is positioned within each of the monochromatic light beams to adjustably control the cross sectional area of the beam to compensate for the varying lighting conditions under which the scenes were photographed and a second plurality of (dichroic) mirrors are used to recombine the regulated monochromatic light beams into a final modulated color content printing beam for exposing the raw stock film.

One type of color light valve suitable for this purpose is shown in U.S. Pat. No. 3,454,328 filed Jan. 19, 1966 and assigned to the assignee of the present invention.

Additionally, in modern motion picture film production, it is often desirable to provide an exposure control device on the additive color system to permit the use of special effects such as fades, lap dissolves, etc. Conventional exposure control devices provide a shutter across the printing light beam which reduces the intensity of the total light beam without affecting the color correction achieved by the light valves.

Prior to exposure of the raw stock, the preprint film is visually inspected by a skilled operator for the purposes of determing the amount of correction desired for each scene. According to conventional practice, lighting correction for each scene is recorded by punching a paper tape. During printing, the photographic film printer reads the punched tape to control the light valves in accordance with the punched information. The position at which desired color changes will be affected is determined by one of three types of cuing systems. The first type of cuing system comprises notches on the preprint film which are sensed by the photographic film printer as the film passes therethrough, to initiate a color change at the beginning of a scene. In a second type of system, RF patches are secured to the preprint film and are similarly sensed to initiate color changes. In a third, and more efficient system, a frame count cuing system is provided in which a unique film address is associated with each desired color change. In this last system, the frame count cuer constantly monitors the amount of film being transported through the film printer and as predetermined frames reach the printing aperture, the frame count cuer initiates the desired color changes. A suitable frame count cuer is shown in application Ser. No. 509,590 filed Sept. 26, 1974 now U.S. Pat. No. 4,072,419 and assigned to the assignee of the present invention. A suitable fader for use on a photographic film printer is shown in U.S. Pat. No. 4,009,959 filed June 26, 1975, assigned to the assignee of the present invention.

Because of the mechanical elements utilized in the above described prior art devices, certain inherent, mechanical delays and bouncing are caused by, among other factors, the mass and inertial forces of these mechanical elements. Therefore elaborate techniques were devised in order to generate a signal prior to exact position of the desired color change on the preprint film, to accommodate for these mechanical delays. Additionally, previous systems did not permit for color balance corrections during the execution of a special effect, such as a fade or lap dissolve.

SUMMARY OF THE INVENTION

It is an object of the present invention to provide an electro-optic light valve, which is particularly suited for use on a color additive light system, to eliminate the mechanical elements and provide a faster response time in which to effectuate color changes.

Another object of the present invention is to provide an electro-optic light valve system which is much more reliable than a mechanical vane type system because of its lack of mechanical elements.

Another object of the present invention is to provide a light valve system, which when used on a photographic film printer, can also be employed to effectuate special effects, i.e., fade-ins, fade-outs, and lap dissolves, etc., without the necessity of a provision of a separate exposure control device.

Another object of the present invention is to provide an electronic control system for driving the electro-optic light valves including a closed loop feedback system to assure accurate execution of the programmed information.

Other objects, features and advantages of the invention will be apparent from the following detailed description taken in connection with the accompanying drawings.

The foregoing and other objects of the present invention are achieved by the provision of an electro-optic light valve and programmable control means to modulate the transmission characters thereof in response to a programmed value. The electro-optic valve is a ferro-electric ceramic material comprising lanthanum modified lead zirconate titanate (commonly designated PLZT) used in combination with a pair of polarizers. In a photographic film printer, three of the described electro-optic light valves are provided, one in each of the primary color beams red, blue and green. A dichroic mirror system separates a substantially white light beam into the three primary color beams and after each of the primary color beams passes through the light valves, they are recombined to form a color modulated printing beam. The programmable control means includes a plurality of circuit means, each connected to one of the electro-optic light valves to supply a voltage thereacross to individually regulate the transmission characteristics to effect the intensity of each of the primary color beams. A sensor, associated with each of the electro-optic light valves, provides feedback to the programmable control system to assure accurate execution of the programmed color changes.

BRIEF DESCRIPTION OF THE PREFERRED EMBODIMENT

The invention is described as it relates to intensity variation of a single light beam. Within the description, a plurality of the electro-optic light valves are described in a particular application on an additive light source for a photographic film printer. Although the description is directed to this specific apparatus and combination, such a detailed analysis should in no way be interpreted to limit the scope of the invention since many other modifications and uses of the invention will be obvious to one skilled in the art.

Figure 1:
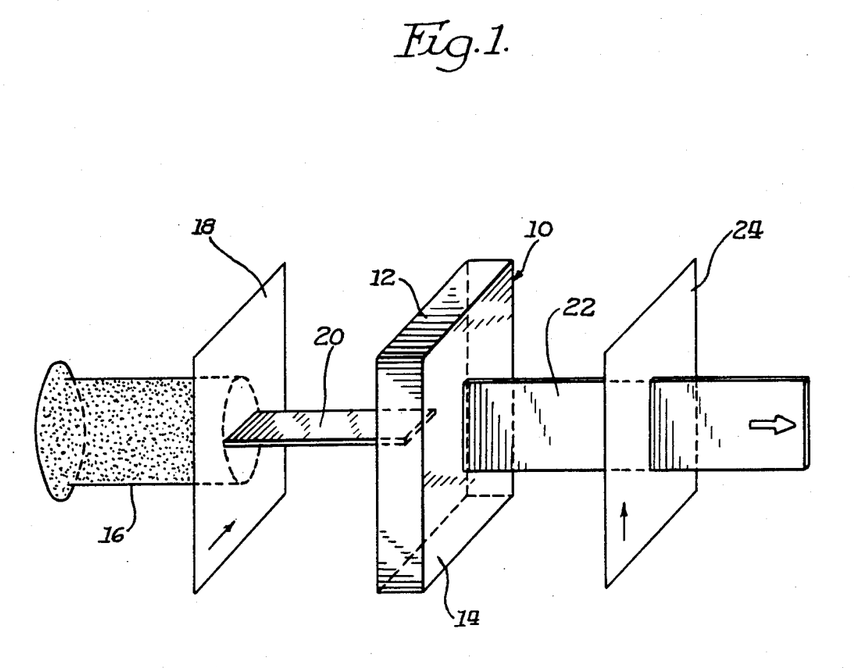
FIG. 1 is an exploded perspective view of one of the electro-optic light valves of the present invention.

To facilitate in understanding of the invention, a brief description of the properties of the specific materials involved is in order. FIG. 1 shows a schematic perspective representation of a simplified form of the electro-optic light valve of the present invention. The central element, generally designated 10, is a ferro-electric ceramic material comprising lanthium modified lead zirconate titanate (hereinafter PLZT). This material exhibits useful bi-refringent properties which can be varied as a voltage is applied across the cell 10. An electrode 12 is secured to the top of the cell 10 and a second electrode 14 is secured to the bottom of the cell so that a voltage can be applied thereacross to vary the bi-refringent characteristics of the cell. In the specific embodiment, an unpolarized light beam 16 is passed through a first polarizer 18 which provides an output beam 20 which is polarized in a horizontal plane. The PLZT cell 10 under a sufficient voltage applied across the electrodes 12 and 14, will then, because of its bi-refringent property, rotate the plane of polarization 90° about a central, optical axis, to provide an output beam 22 which is polarized in a vertical plane. A second polarizer 24, which is conventionally termed an analyzer, is placed adjacent or behind the PLZT cell having a vertical polarization axis so that the vertically polarized beam 22 passes directly through the analyzer 24. As the amount of voltage applied to the cell 10 through the electrodes 12 and 14 decreases, the angle between the plane of polarization of the light beam between its entrance point and exit point of the PLZT cell 10 changes. Thus, the plane of polarization of the output beam 22 will rotate from a vertical orientation to a horizontal orientation as the voltage across the electrodes is reduced. Since the polarizing plane of the analyzer 24 remains vertical, the amount of light passing through the analyzer is reduced to a point that, when they are crossed, 90° therebetween, no light will exit from the analyzer. The amount or intensity of light passing through the analyzer is a function of the sine square of the angle between the plane of polarization of the exit beam 22 with respect to the entrance beam 20. Therefore, if the angle between the respective light beam planes of polarization is 90°, then substantially all of the light will exit through the analyzer. If however, no voltage is applied across the electrodes 12 and 14 of the cell 10 the exit beam 22 will be polarized in the same plane as the entrance beam 20, the sine square of zero being zero, no light will pass through the exit analyzer. Similarly for 22½°, 14.6% passes through the analyzer, for 45°, 50% of the light passes through the analyzer, and for 67½°, 85.3% of the light passes through the analyzer.

Figure 7:
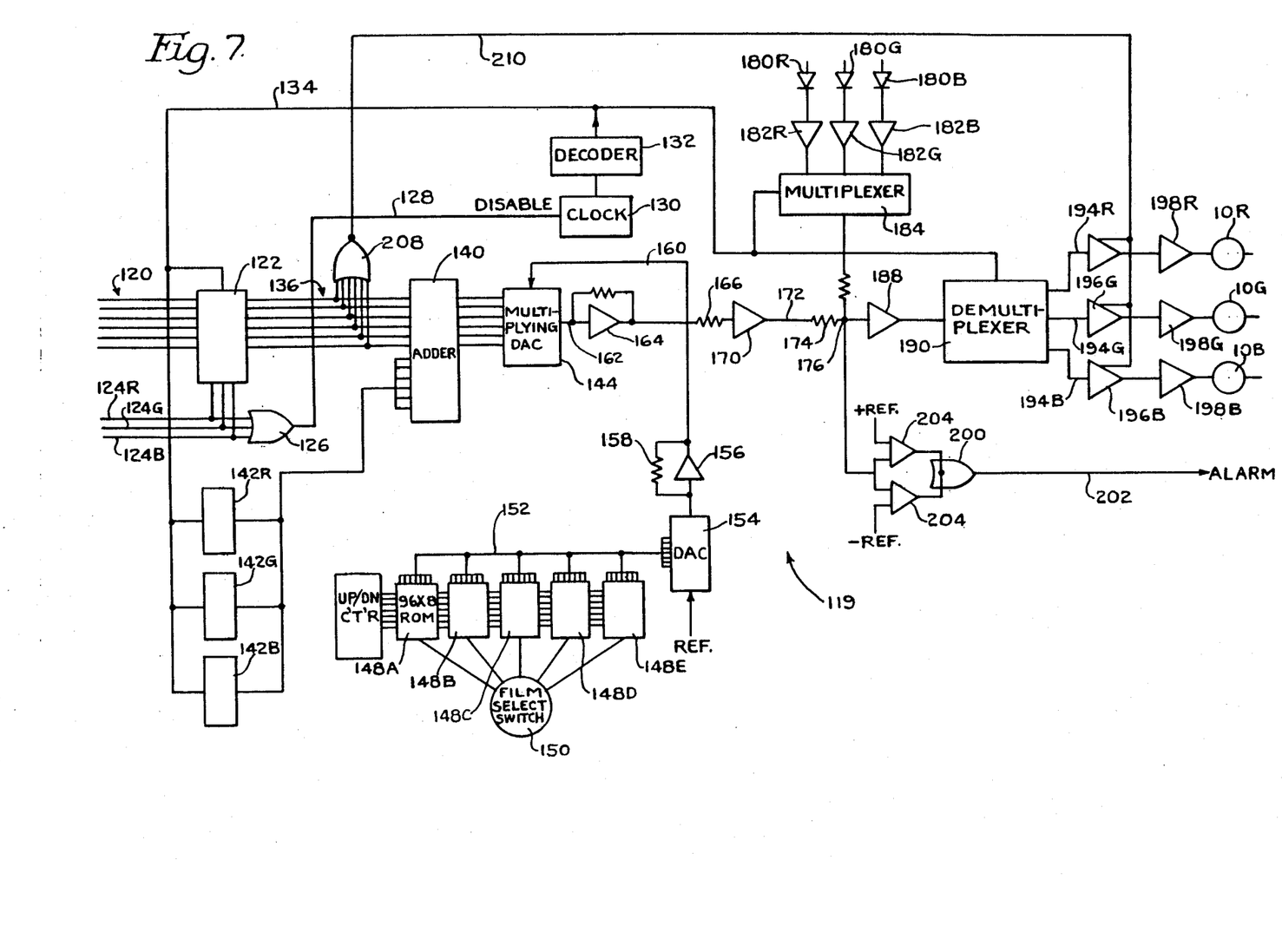
FIG. 7 is an electronic block diagram of the programmable control means for the electro-optic light valves, as applied to an additive light system, of the present invention.

The control system for varying the transmission characteristics of the PLZT cell by applying predetermined voltages across the electrodes 12 and 14 is particularly adapted to the use of the present invention on an additive light system of a photographic film printer. This electronic control system is shown in FIG. 7, and although designed for concurrent driving of a plurality of light valves 10, can easily be adapted for driving a singular light valve as shown in FIG. 1. The description of the electronic control system will be discussed in detail after a description of the particular adaptation of the light valve as used in a color additive light source of the present invention.

Figure 2:
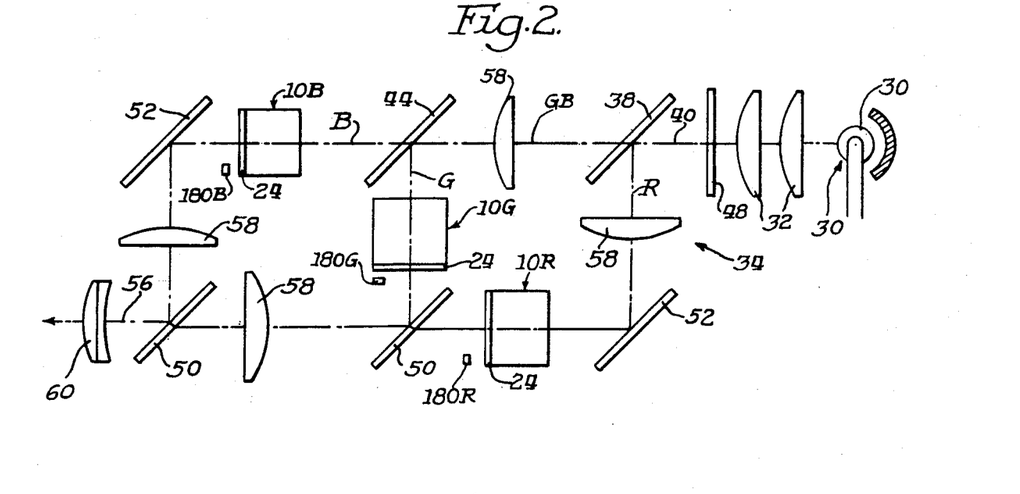
FIG. 2 is a diagrammatic representation of a color additive light system as used on a photographic film printer incorporating three electro-optic light valves of the present invention.

FIG. 2 illustates one embodiment wherein three light valves 10 are used to vary the intensity of a photographic film printer printing beam to provide for color correction. The additive light system includes a light source 30 which is focused by a pair of heat absorbing lenses 32 into a dichroic system, generally designated 34. The dichroic system includes a first dichroic mirror 38 which splits the substantially white light beam 40 from the light source 30 into a downwardly directed monochromatic red beam R while passing the green and blue portions to a second dichroic mirror 44. The mirror 44 splits the green, blue beam B while passing the blue beam therethrough. In this particular adaptation, the white light beam 40 is initially polarized by a polarizer 48 before entering the dichroic system so that the three primary color beams red, green and blue, when split into separate beams, are already polarized. Each of the red, green and blue beams is then directed through a PLZT cell 10R, 10G, and 10B corresponding to the appropriate monochromatic beam and an analyzer 24. The intensity of the individual red, green and blue beams is then varied by applying predetermined voltages across the PLZT cell 10 so that the output beams through the analyzers 24 are adjusted according to a predetermined value. The separate red, green and blue beams are then recombined by mirrors 52 and partially silvered mirrors 50 into a final, color modulated output printing beam 56. Various lens elements 58 within the system serve to maintain and direct the light beams and a final lens element 60 focuses the modulated color printing beam 56 for the printing aperture.

Figure 3:
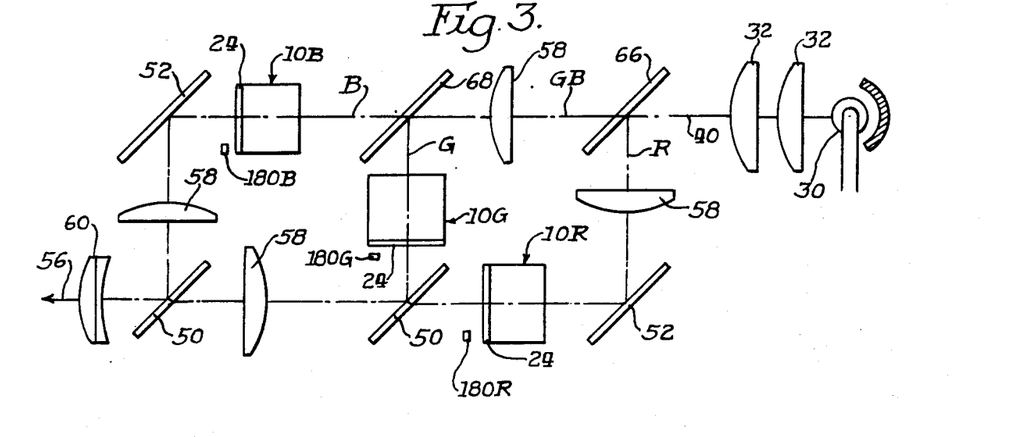
FIG. 3 is a diagrammatic representation of an alternate embodiment of the color additive light system for a photographic film printer using a plurality of electro-optic light valves of the present invention.

Another embodiment of a additive light source using three PLZT light valves 10 of the present invention is shown in FIG. 3, wherein similar elements as described above are identified by the same numerals. In this embodiment, the white light beam 40 is not passed through an initial polarizer as above. The first dichroic mirror 66 itself contains a polarizing surface so that the downwardly directed monochromatic red beam is polarized in a predetermined plane. The green and blue beam passing therethrough is subsequently polarized by a second polarizing dichrolic mirror 68 providing a polarized monochromatic green beam and a polarized monochromatic blue beam. The monochromatic beams are then again directed to a plurality of electro-optic light valves 10 which function to regulate the intensity of the output beams through the analyzers 24 as above. A final color modulated output printing beam 56 is a result of a combining of the individual light beams.

Figure 4:
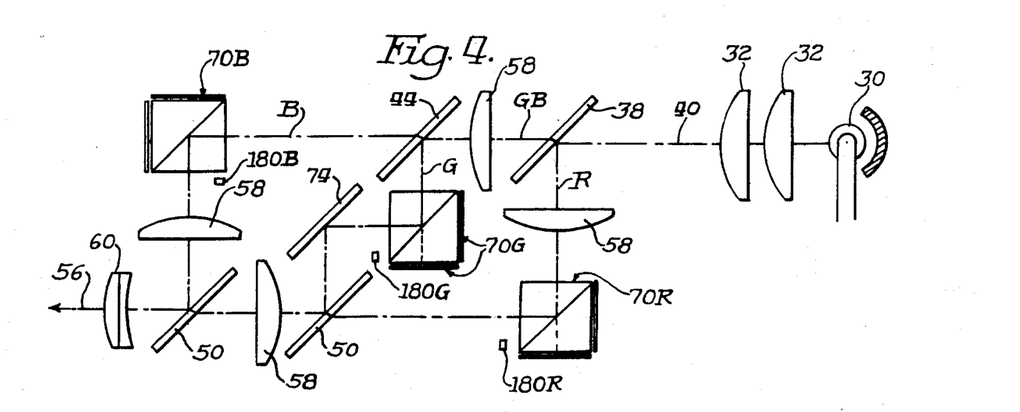
FIG. 4 is yet another embodiment of a additive light valve assembly for use on a photographic film printer utilizing a plurality of electro-optic light valves of the present invention.

A third embodiment of the color additive light system using the PLZT light valves 10 of the present invention is shown in FIG. 4. Again, the same numerals are used to identify corresponding elements. The major difference in this third embodiment is the provision of a high efficiency light valve, generally designated 70, which redirects the incoming beam 90°. In this system dichroic mirrors 38 and 44 produce monochromatic, unpolarized red, green and blue light beams which subsequently are directed through the modified PLZT cells 70R, 70G and 70B. The lowermost righthand reflecting mirror 52 and uppermost lefthand reflecting mirror 52 are not necessary since the beam is redirected through an angle of 90° by the light cells 70R and 70B respectively. However, an additional reflecting mirror 74 is provided to redirect the output from the light valve 70G to the recombining mirror 50 to combine a modulated green beam with the red beam and a second mirror 50 to recombine the two with the blue beam for a color modulated output printing beam 56.

Figure 5:
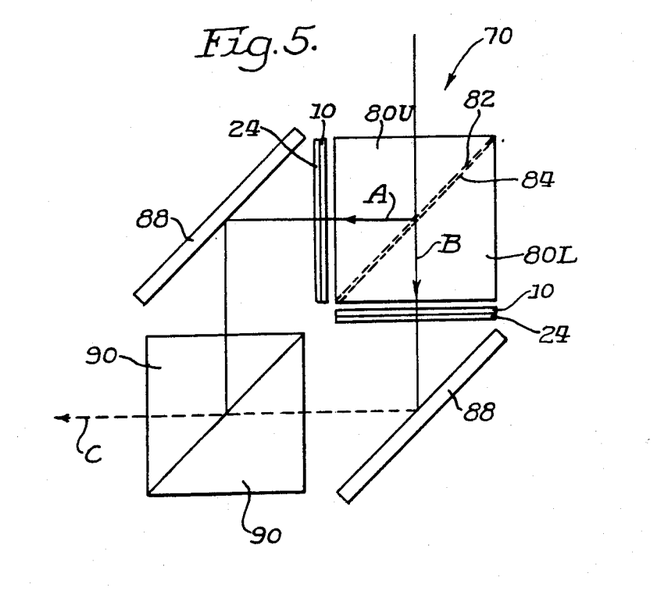
FIG. 5 is a diagrammatic representation of one embodiment of the electro-optic light valves for use on the system as shown in FIG. 4.

FIG. 5 is an enlarged diagrammatic representation of the elements in each of the electro-optic light valves 70 used in the additive light source system as shown in FIG. 4. The embodiment as shown in FIG. 5 has the added advantage that it has a much higher efficiency than the light cells as shown in FIG. 1 and therefore enables the use of a smaller, less expensive and lower intensity light source 30. This embodiment utilizes a pair of prisms 80U and 80L mounted with their reflective sides adjacent one another. The internal adjacent surfaces 82 and 84 on the upper and lower prisms 80U and 80L respectively are treated with a polarizing beam splitter coating which reflects a portion of the entering light beam, while polarizing it in one plane, to the left as indicated by arrow A. A second portion of the entrance beam is polarized in a second plane perpendicular to the first and transmitted in the direction of arrow B through the lowermost prism 80. The plane of polarization between the beam A forms an angle of 90° with the plane of polarization of the light beam along arrow B. The light beams A and B then pass through a PLZT cell 10 and analyzer 24. These two PLZT cells 10 are driven simultaneously and the output beams reflected by mirrors 88 to a second set of prisms 90 which recombine the light beams A and B into a single output beam in the direction of arrow C. Since the light beam arrow A is polarized in one direction and the light beam B is polarized in another direction, in a plane 90° rotated with respect to A, the output light beam C is circularly polarized.

The effect of this beam splitting and recombining enables the use of light which is polarized in perpendicular planes and thus will approximately double the output or the intensity of the light beam C with respect to that provided by the light valves of FIGS. 1 and 2.

Figure 6:
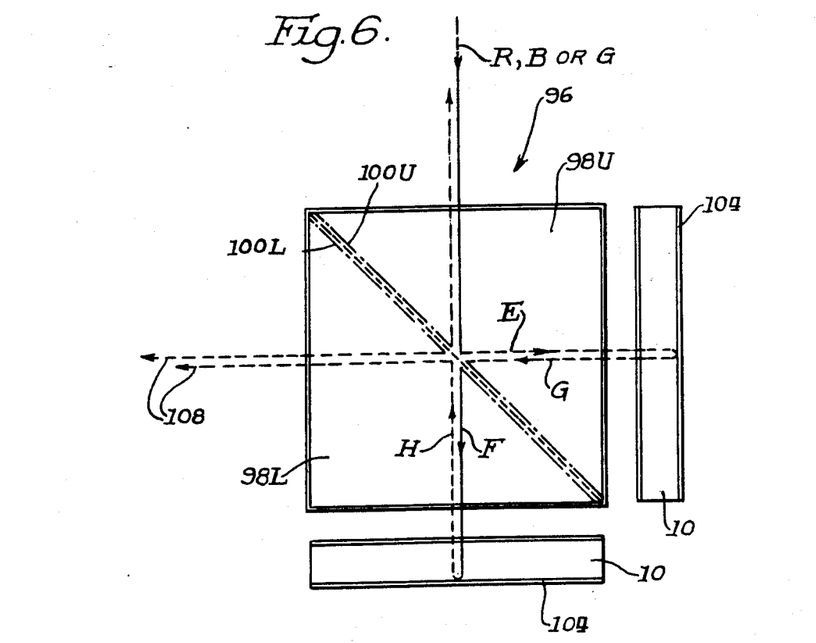
FIG. 6 is a diagrammatic representation of yet another embodiment of one of the electro-optic light valves as shown in the assembly of FIG. 4.

FIG. 6 shows another embodiment showing all of the elements which can be used for each of the electro-optic light valves 70 as shown in the assembly of FIG. 4. This is again a high efficiency light valve similar to that described with respect to FIG. 5, but uses a second pair of mirrors which eliminate the need for an analyzer since, as will be described below, the polarizing beam splitter coating serves to function both as the initial polarizer and the analyzer. More particularly, a folded PLZT cell, generally designated 96, is provided which includes a pair of prisms 98U and 98L having polarizing beam splitter coatings 100U and 100L on their inner adjacent surfaces for splitting and polarizing the incoming monochromatic light beam R, G, or B as previously described. In this instance, the split polarized beam travel in the directions as designated by the arrows E and F and are directed to a pair of PLZT cells 10. However, unlike previously, in this instance, each of the PLZT cells 10 includes a rear mirrored surface 104 which reflects the beams E and F in the opposite direction as designated by the dotted lines G and H. The PLZT cells 10 have altered the plane of polarization of the light beams E and F so that the returning beams G and H will encounter the polarizing surfaces 100U and 100L as they return through the prisms 98U and 98L. The polarizing surfaces 100U and 100L then act as the analyzers 24 in the previous description and direct a desired controlled portion as a circularly polarized output beam 108 for use in the dichrolic system as shown in FIG. 4.

THE ELECTRONIC CONTROL SYSTEM

As discussed previously, in order to regulate the amount of light being transmitted by the electro-optic light valves, it is only necessary to vary the voltage across the electrodes 12 and 14 of the PLZT cell 10 depending upon the specific arrangement of the polarizer and analyzer, for example as shown in FIG. 1, zero-voltage applied across the cells prevents any light from being transmitted through the light valve while a predetermined full voltage across the cell causes full rotation of the polarized beam and thus permits substantially total light transmission through the light valve. The control of the voltage applied to the cell can be accomplished through a number of various means. For example, one inexpensive method for employing the use of the present invention on photographic film printers could be achieved by modification of existing mechanical light control systems for film printers such as that shown in U.S. Pat. Nos. 3,454,328 and 3,533,693 both of which are assigned to the assignee of the present invention. Both of these patents disclose a mechanical light valve system in which vanes are rotated into the optical path of the individual monochromatic light beams to individually adjust the intensity of the three monochromatic light beams to generate the desired color content of the output printing light beam. The mechanical light valves as shown in these patents could be modified by replacing each set of vanes with a potentiometer connected to the appropriate PLZT light valve 10. Thus, the mechanical light valve portion would adjust the potentiometer and thus the voltage applied by the appropriate cells through the potentiometer. The transmission of each cell 10 could be individually controlled according to a conventional paper tape which actuates the mechanical light valves as shown in the above referenced patents. Although this would be an inexpensive and extremely simple modification of existing equipment, which would produce the desired voltage changes for the PLZT cells 10, it would still include many mechanical elements which can be eliminated by the use of an appropriate electronic control system.

A suitable electronic control system generally designated 119, is shown in FIG. 7 which not only controls the voltage applied to the respective cells to control the printing beam color content, but also provides the necessary fading functions which are now conventionally done by the use of a separate pair of fader vanes positioned adjacent the light source. A suitable, mechanical fader is shown in U.S. Pat. No. 4,009,959 filed June 26, 1975. A suitable tape controlled additive light source for use on photographic film printers is disclosed in U.S. Pat. No. 4,072,419. Both of the above are assigned to the assignee of the present invention and are incorporated herein by reference.

The present disclosure is particularly suited for use with a photographic film printer control unit as shown in U.S. Pat. No. 4,045,136 which discloses a combined control unit which provides both printing beam color content information as well as film scene length information from a single prepunched paper tape. This application is assigned to the Assignee of the present invention and is incorporated herein by reference. Particularly, the last referenced application discloses a control unit including a memory for storing the predetermined or programmed values for the red, green and blue channels. Each color value is determined by the combination of signals on six output lines from the memory. In addition, a sequencer sequentially calls up the data for the red, green and blue channels as described in the disclosure.

Referring to FIG. 7, the electronic control system includes the PLZT cells 10R, 10G and 10B which modulate the intensity of the individual monochromatic light beams within the dichroic system 34 as described previously. Color data, relating to the particular intensity of the monochromatic light beams, is provided to the control system 119 in digital form from the printer control unit above on the six lines, generally designated 120 to a data register 122. As described above, the six lines 120 sequentially provide color data to the data register for each of the red, green and blue color channels. Sequencing is accomplished by a sequencer in the printer control unit of the prior application on the three lines designated 124R, 124G and 124B, which, when high, enter the appropriate color data, for a particular monochromatic light beam setting, in the data register. The strobe lines 124 are connected to a NAND-gate 126 which provides a disable signal on line 128 to a clock 130. The clock 130, through a decoder 132 on line 134 selects and sequentially outputs appropriate color data when enabled by the strobe lines 124 on lines 136 to an adder 140. The disable signal to the clock 130 prevents the occurrence of a situation where all data would be lost to the adder 140 during the data input period which would effect the color content of the printing light beam as described below.

The data on line 136 is combined by the adder 140 with manually preset data from red, green and blue trim controls 142R, 142G and 142B. The red, blue and green trim controls 142R, 142G and 142B permit selective biasing of the various channels to ultimately bias the color content of printing light beam to produce a final film print adapted for a particular use. For example, conventional television requires a relatively low contrast final film print which can be accommodated by appropriate adjustments to the trimmers 142. The output, or the data, in the adder is sequentially transferred to a multiplying digital-to-analog converter 144.

The multiplying DAC 144 serves to adjust the color data in the event that a fade-in or fade-out operation is to be performed in the printing process. Referring generally to the bottom center of the drawings, the control system 119 is connected to the output of a fader, or exposure control device, as disclosed and described in the above incorporated U.S. Pat. No. 4,009,959. A portion of that disclosure is shown in FIG. 7 to illustrate the interfacing with the present system. Particularly, the fader includes five read only memories 148A through 148E. The read only memories are each programmed as described in the prior application, with a particular film exposure characteristic curve for the particular film being printed. One of the ROMs 148 is manually selected by a film selector switch 150 which enables the desired ROM to provide a digital output on line 152 to a digital-to-analog converter 154. The output of the DAC 154 is applied to an inverting amplifier 156. The amplifier 156 has a predetermined gain as determined by the feedback resistor 158 and the output thereof is applied along line 160 to the multiplying DAC 144 and operates, in the case of a fade-in, to reduce the output 162 of the multiplying DAC in accordance with the analog output of the DAC 154 in accordance with the programmed film characteristic curve. Thus, the output 162 is modified when the fader is actuated independently of the data input means. When the fader is not in operation, as during normal printing of a particular scene, the multiplying DAC, in effect, does not adjust the color data values or more simply provides a unity multiplication, to the output of the adder 140. The output 162 is applied through an amplifier 164 and through a resistor 166 to a log amplifier or non-linear amplifier 170 where it is converted into a logarithmic function equivalent to the original 0.025 log E function used in programming of color tapes. The log amplifier output 172 is connected through a resistor 174 to a summing junction 176 and summed with closed loop, feedback information.

Referring to FIGS. 2, 3 and 4 of the drawings, a plurality of monochromatic cell output sensors 180R, 180G and 180B, are positioned in each of the respective light channels in the dichroic system to sense or detect the intensity of each of the individual outputs of the PLZT cells 10R, 10G and 10B, respectively. The cell sensors 180 receive a small portion of the light transmitted through each of the respective light valves to provide necessary feedback information relating to the intensity of the monochromatic light beam being transmitted by each of the cells 10. A plurality of pre-amplifiers 182R, 182G and 182B provide an amplified signal to a multiplexer 184 which is synchronized by the clock 130 in relation to the output 172 of the log amplifier 170 to the summing junction 176. The multiplexing permits comparing the red data input with the red sensor feedback and so on for the remaining cells while using as much of the common hardware as possible to provide a common functional control, amplification, and summing to achieve identical channel characteristics.

The summed value is applied to an attenuating, intermediate amplifier 188. The output of the amplifier 188 is then demultiplexed by a demultiplexer 190 driven by the same clock 130 to provide three separate output signals 194R, 194G and 194B for controlling the corresponding cells 10R, 10G and 10B, respectively. The output signals 194 are analog signals but are not continuous signals because of the multiplexing sequence and, are therefore applied to a plurality of sample and hold amplifiers 196R, 196G and 196B, respectively, which provide a continuous signal output to the high voltage PLZT cell drive amplifiers 198R, 198G and 198B thus closing the loop.

An error detector 200 is connected to the summing junction to provide a fail safe alarm signal on line 202 in the event that the system fails to null out the loop.

The error detector 200 includes a plus and minus reference voltage or range of permissible error by the amplifiers 204 as shown in FIG. 7 which activates the alarm if the error reaches a set, predetermined level.

As a result of the rapid response of the specific elements used, the control system when used with the electronic light valves described above, permits rapid printing light color content changes at, or within, a frameline even at high printing speeds since the step response of the overall system is less than 0.5 milliseconds. The control system 119 in combination with the exposure control unit provides bidirectional fading with variable film exposure characteristics. The use of the closed loop electronic control system eliminates the need for a film gate or printing aperture photometer and also produces the predetermined color content of the printing light beam independent of the printing lamp voltage which is crucial in all prior art film printers.

At the right top of FIG. 7, a gate 208 receives input from the color data lines 136 and is utilized, if a predetermined, code value is identified, to provide an override signal on line 210 driving all of the sample and hold amplifiers 196 to zero which prevents any light from being transmitted through the cells to the printing aperture. This electronic system eliminates the need for the prior art dousers which are used by printing laboratories during the setup of a printing run to prevent accidental exposure of the film.

The foregoing detailed description has been given for clearness of understanding only and no unnecessary limitations should be understood therefrom as some modifications will be obvious to those skilled in the art.

We claim:

1. A light system for producing a modulated color content output beam, comprising:
    a light source for producing a beam of substantially white light;
    a plurality of band pass filters positioned in said beam path for dividing said beam into a plurality of monochromatic light beams;
    an electro-optic value means positionable in each of said monochromatic light beams for attenuating the amount of said light passing therethrough;
    programmable control means for said valve means to modulate the transmission characteristics thereof in response to a predetermined value provided by a plurality of data input means;
    multiplexing means connected to said data input means providing a single output to control said valve means; and
    a plurality of mirrors positioned in at least some of said monochromatic light beams to recombine said beams into a single beam of modulated color content.

2. The light system of claim 1 wherein said plurality of band pass filters are dichroic mirrors for dividing said white light beam into a plurality of monochromatic light beams.

3. The light system of claim 2 wherein said plurality of mirrors comprises dichroic mirrors for combining said monochromatic beams into a single beam.

4. The light system of claim 1 wherein said programmable control means includes a plurality of circuit means each connected to one of said electro-optic value means to apply voltage thereacross in response to said predetermined value.

5. The light system of claim 1 including intermediate amplifying means connected to said multiplexer for attenuating said single signal and demultiplexing means receiving said signal output for providing a plurality of output signals, one for driving each of said electro-optic valve means.

6. The light system of claim 5 including a digital to analog converter associated with said multiplexing means and a nonlinear amplifying means associated therewith to provide a nonlinear, amplifier signal to said intermediate amplifying means.

7. The light system of claim 6 wherein said circuit means include feedback means providing a closed loop.

8. The light system of claim 7 wherein said feedback means comprises a plurality of sensors, one associated with each of said electro-optic valve means, for producing a signal corresponding to the intensity of the light transmission therethrough and comparator means for comparing said sensor output signal with said predetermined value for correction thereof.

9. The light system of claim 8 including an error detector to signal when said comparator error reaches a predetermined level.

10. The light system of claim 9 including fader circuit means associated with said intermediate amplifier for controlling said electro-optic valve means, independent of said plurality of data input means.

11. The light system of claim 1 including a polarizer in said beam of white light and said electro-optic valve means includes a suitable electro-optic cell having controlled bi-refringence characteristics for rotating the angle of said polarized monochromatic light beam and an analyzer for reducing the intensity of said monochromatic light beam as a function of said rotation.

12. The light valve system of claim 1 wherein each of said data input means includes adjustable biasing means associated therewith to permit automatic biasing of said predetermined value provided by said data input means.

13. The light system of claim 1 including second programmable means connected to said multiplexing means to vary said predetermined value provided by said data input means.

14. A light system for producing a modulated color content output beam, comprising:
    a light source for producing a beam of substantially white light;

a plurality of band pass filters positioned in said beam path for dividing said beam into a plurality of monochromatic light beams;

electro-optic valve means positionable in each of said monochromatic light beams for attenuating the amount of said light passing therethrough;

programmable means for controlling said valve means to modulate the transmission characteristics thereof in response to a predetermined value, said programmable means including a plurality of circuit means each having data input means connected to a multiplexer providing a single output signal, intermediate amplifying means connected to said multiplexer for attenuating said single signal, and demultiplexing means receiving the output of said intermediate amplifying means to provide a plurality of output signals, one for each of said electro-optic valve means.

15. The light system of claim 14 including a digital to analog converter associated with said multiplexing means and a nonlinear amplifying means associated with said digital to analog convertor to provide a nonlinear amplified signal to said intermediate amplifying means.

16. The light system of claim 15 wherein said circuit means include feedback means providing a closed loop.

17. The light system of claim 16 wherein said feedback means comprises a plurality of sensors, one associated with each of said electro-optic valve means, for producing a signal corresponding to the intensity of the light transmission therethrough and comparator means for comparing said sensor output signal with said predetermined value for correction thereof.

18. The light system of claim 17 including an error detector to signal when said comparator error reaches a predetermined level.

19. The light system of claim 18 including fader circuit means associated with said intermediate amplifier for controlling said electro-optic valve means, independent of said plurality of data input means.

20. The light system of claim 14 wherein the controlled bi-refringence characteristics of the electro-optic cells are controlled by said programmable control means.

21. The light system of claim 14 wherein said electro-optic cells are ferro-electric ceramic material comprising lanthanum-modified lead zirconate titanate.

22. An additive color system for a photographic film printer for producing a modulated color content printing beam, comprising:

a light source for producing a beam of substantially white light;

a plurality of dichroic mirrors positioned in said beam path for dividing said beam into a plurality of monochromatic light beams;

an electro-optic modulator positionable in each of said monochromatic light beams for attenuating the intensity of said monochromatic beam, each of said electro-optic modulators including a first, planar light polarizer for polarizing the light passing therethrough, an electro-optic cell having suitable controllable bi-refingence characteristics for rotating the polarized plane of light, and a second, planar polarizer for reducing the intensity of said light beam as a function of the degree of rotation of said polarized beam;

programmable means for controlling said modulators in response to a predetermined value provided by a plurality of data input means;

multiplexing means connected to said data input means providing a single output to control said electro-optic modulators; and a plurality of dichroic mirrors positioned in each of said light beams, after said electro-optic modulators, to recombine said beams into a single printing beam of modulated color content.

* * * * *

UNITED STATES PATENT OFFICE
CERTIFICATE OF CORRECTION

PATENT NO. : 4,108,537
DATED : August 22, 1978
INVENTOR(S) : Charles J. Watson and Walter Hrastnik It is certified that error appears in the above-identified patent and that said Letters Patent are hereby corrected as shown below:

Column 10, line 31 (Claim 6, line 4), change "amplifier" to --amplified--.

Signed and Sealed this

Thirty-first Day of July 1979

[SEAL]

Attest:

LUTRELLE F. PARKER
Attesting Officer
Acting Commissioner of Patents and Trademarks